W. A. PALMER.
AMALGAMATOR FOR GOLD AND SILVER.

No. 36,963. Patented Nov. 18, 1862.

UNITED STATES PATENT OFFICE.

W. A. PALMER, OF SAN FRANCISCO, CALIFORNIA.

IMPROVEMENT IN AMALGAMATORS FOR GOLD AND SILVER.

Specification forming part of Letters Patent No. 36,963, dated November 18, 1862.

*To all whom it may concern:*

Be it known that I, W. A. PALMER, of San Francisco, in the county of San Francisco and State of California, have invented a new and useful Improvement in Heating Gold and Silver Amalgamators by Steam; and I do hereby declare that the following is a full, clear, and exact description of the same, reference being had to the accompanying drawings, making a part of this specification, in which—

Figure 1:
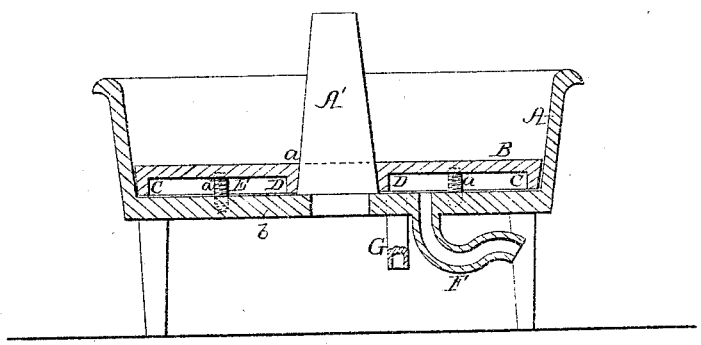
Figure 2:
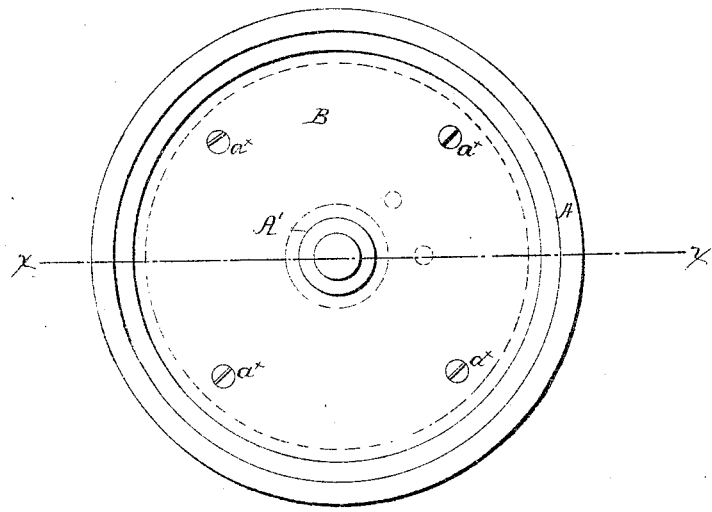

Figure 1 is a vertical central section of my invention, taken in the line $x\ x$, Fig. 2. Fig. 2 is a plan or top view of the same.

Similar letters of reference indicate corresponding parts in the two figures.

This invention consists in placing or arranging a steam chest or chamber within the pan of an amalgamator in such a manner that the pulp or crushed ore within the pan will be gently heated while the process of amalgamation is going on, and the steam chest or chamber be capable of being readily removed when worn by the agitator or mixer so as to be unserviceable and a new one adjusted in its place, the pan at the same time not being subjected to any wear, and consequently lasting an indefinite period.

To enable those skilled in the art to fully understand and construct my invention, I will proceed to describe it.

A represents the pan or tub of a gold or silver amalgamator, which may be constructed in any of the known ways. In the drawings it is represented of circular form, and is provided at its center with a cone, A'. This is commonly termed the "Knox pan."

B represents an annular plate, the diameter of which corresponds with that of the lower part of the pan A. This plate has a flange, C, at the under side, which extends all around it at its edge and projects downward a suitable distance to form a support for the plate. A similar flange, D, also projects down around a central aperture, $a$, of circular form, through which the cone A' passes. These flanges C D rest upon the bottom $b$ of the pan when the plate B is fitted therein, and a chamber, E, is formed by said flanges between the plate B and the bottom of the pan, as shown clearly in Fig. 1. The outer edge of the plate B and flange C should fit snugly against the inner side of the pan, and the inner central flange, D, should fit snugly around the cone A'. The plate B may be secured to the bottom $b$ of the pan A by means of screws or bolts $a^x$.

F is a steam-pipe which passes through the bottom $b$ of the pan and communicates with the chamber E.

G is an escape-pipe, which also communicates with the chamber E and admits of the escape of steam and water of condensation from said chamber.

The operation is as follows: The pulp or crushed ore is placed in the pan A with a requisite amount of quicksilver, the plate B forming a false bottom for the same, and the steam is admitted into the chamber E through the pipe F, the pulp or crushed ore being thereby heated while it is agitated and mixed with the quicksilver by the rotary mixer. (Not represented.) When the plate B becomes worn by use, it may be readily removed and a new one adjusted in its place.

Heating amalgamators by steam, I am aware, is not new; but hitherto the steam has been introduced underneath the bottom $b$ of the pan. A false bottom could not be used above it, as there would be in that case a double thickness of metal for the heat to pass through, and that would prevent the pulp or ore being properly heated. The bottom $b$, therefore, when worn through, renders the pan useless and a new one is required, which involves considerable expense.

By my invention the pan is not subjected to any wear, and consequently will last indefinitely, while the plate B, with its flanges, may be renewed at an inappreciable cost.

Having thus described my invention, what I claim as new, and desire to secure by Letters Patent, is—

In combination with an amalgamating-pan, A, a steam chest or chamber, E, formed of a removable plate or false bottom, B, provided with one or more flanges at its under side, substantially as and for the purpose herein set forth.

W. A. PALMER.

Witnesses.
JNO. O. HANSCOM,
W. L. PALMER.